Patented Apr. 18, 1939

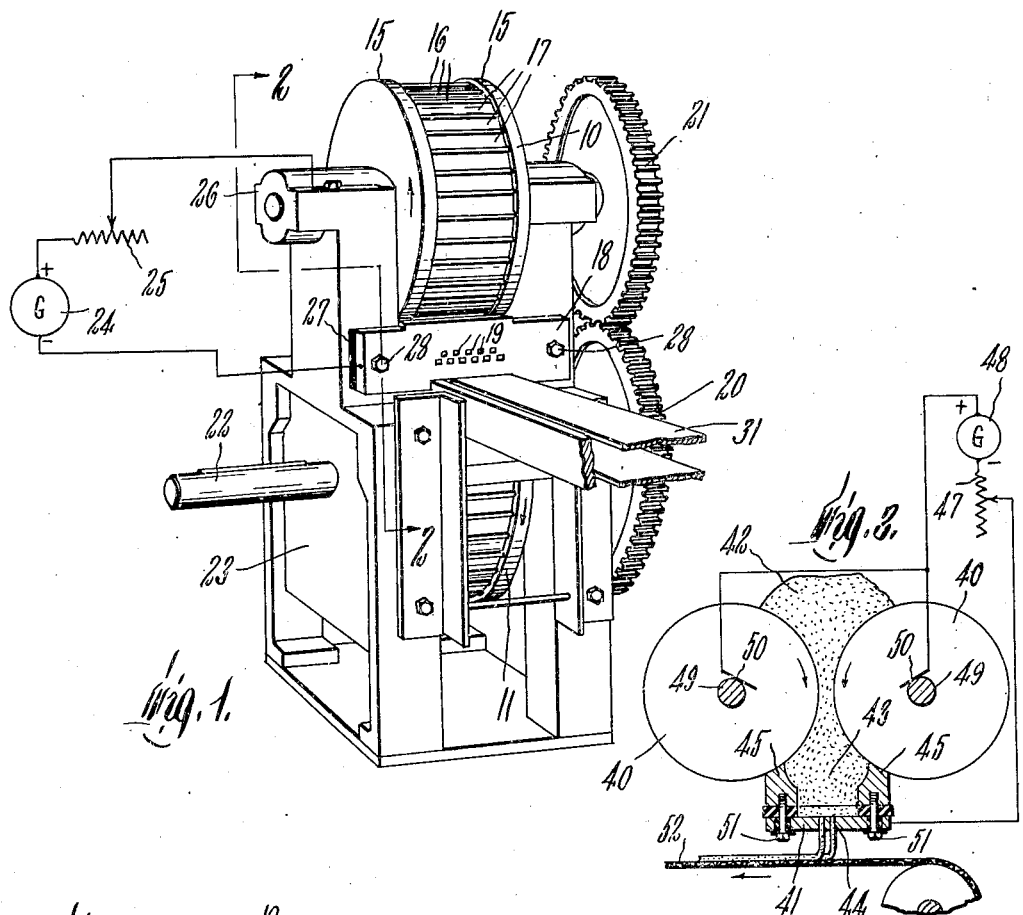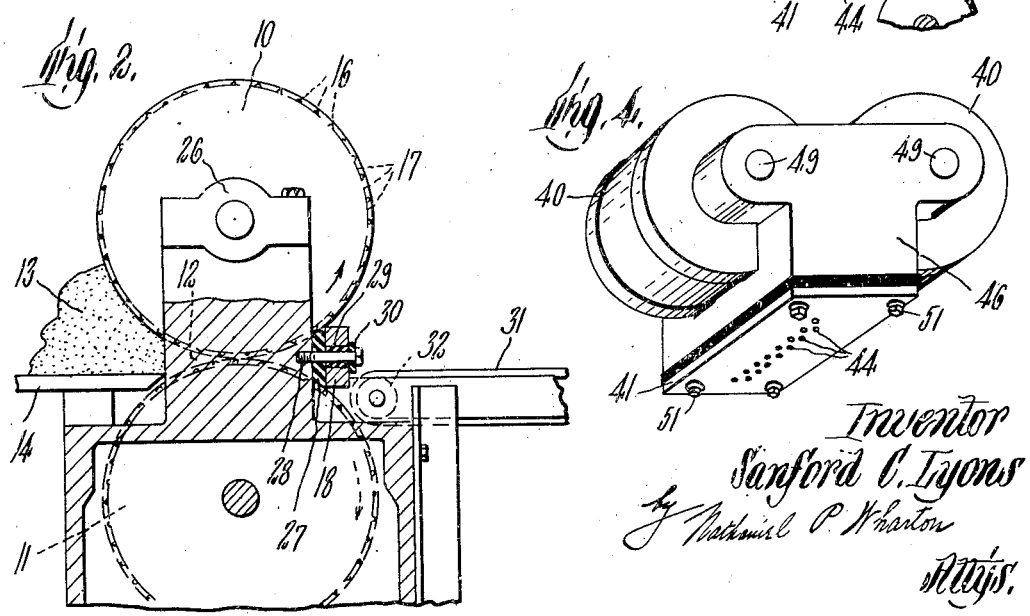

2,154,949

UNITED STATES PATENT OFFICE 2,154,949

ART OF EXTRUDING MOIST PLASTIC MATERIAL

Sanford C. Lyons, Bennington, Vt., assignor to Bird Machine Co., Walpole, Mass., a corporation of Massachusetts Application May 12, 1937, Serial No. 142,179

5 Claims. (Cl. 204—1)

This invention relates to the art of extruding moist plastic material through a perforated die to produce extruded bodies of desired cross-sectional shape and size. It deals more especially with moist plastic material consisting essentially of cohesive moist particles of such fine size as to exhibit electrophoresis, that is, tendency to be attracted to an electrically charged surface.

While not limited thereto, the invention hereof is of especial utility as applied to moist plastic clay, for instance, clay as recovered from aqueous suspension in filter presses or in electrophoretic centrifuges of the type described in my Patent No. 2,057,156, dated October 13, 1936. Before marketing clay thus recovered, it is desirable to dehydrate the clay as far as is practicable so as to avoid the difficulty of handling or storing moist plastic material as well as to reduce the cost of transportation and to furnish a substantially dry product to those consumers requiring such a product. The present invention affords an advantageous method of and machine for extruding moist plastic clay as elongated bodies of comparatively small, substantially uniform cross-sectional area, as such bodies lend themselves to easy handling and to rapid and substantially uniform drying as compared with the handling and drying of clay masses, such as the clay cakes recovered from filter presses or the shapeless clay gobs emitted from electrophoretic centrifuges.

In accordance with the present invention, moist plastic material, such as clay, is fed into the nip of a pair of rolls or equivalent propelling members and thence extruded through a perforated die substantially closing off discharge from the nip excepting where such die is perforated; and while the moist plastic material is being extruded through the perforated die, the peripheries of the feed rolls or the surfaces of equivalent propelling members are impressed with a positive electric charge and the die with a negative electric charge, in consequence of which moisture is attracted from the material to the die surfaces, including the walls of the perforations or extrusion orifices, and serves to lubricate such surfaces and maintain them in substantially unfouled condition as fine particles constituting such material is being attracted to the roll peripheries and the material is thus being propelled by the roll peripheries with less slippage than would otherwise occur. The present invention thus enables the extrusion of moist plastic clay or similar material at lower water content than when extrusion is performed in the absence of electroattraction of water to the extrusion orifices, especially when the extrusion orifices are of small cross-sectional area, for, in such latter instance, there is apt to be decided tendency for the material being extruded to foul or clog the extrusion orifices and/or to increase the power required for the extrusion of a given amount of material. A moist plastic clay mass of a moisture content less than about 25% is illustrative of material that tends to foul or clog extrusion orifices when no provision is made to lubricate the orifice walls. It is, of course, highly desirable to perform the extrusion of moist plastic clay at as low a moisture content as can be economically attained therein by the previous operations, for instance, the filter-pressing or electrocentrifuging operations, by which such clay is prepared, since the extrusion of moist plastic clay at minimum moisture content comports with small size drying equipment and low cost in dehydrating a given amount of clay to the desired substantially complete dryness.

With the foregoing and other features and objects in view, the invention hereof will now be described in further detail with particular reference to the accompanying drawing, wherein Figure 1 depicts in perspective a form of machine for practicing the method hereof.

Figure 2 is a composite side elevation and vertical section through the machine on the line 2—2 of Figure 1.

Figure 3 represents a section through another form of machine for performing the method hereof.

Figure 4 shows in perspective the extrusion die and associated feed rolls of the machine of Figure 3, viewing the machine at an angle to display such parts to best advantage.

The invention hereof will now be described specifically in terms of the extrusion of moist plastic clay. The moist plastic clay may be produced by a series of operations inclusive of the steps of suspending crude clay in water to form a slurry, removing sand, mica, and other relatively coarse impurities from the slurry, as by riffling, settling, or centrifuging treatment, and recovering the clay solids from most of the water of the slurry, as in filter presses, settling vats, or electrophoretic centrifuges of the type disclosed in my Patent No. 2,057,156. The moist plastic clay thus recovered may have a moisture content of, say, about 20%, or even less.

The form of machine illustrated in Figure 1, which is designed to feed the moist plastic clay under pressure substantially horizontally to the perforated extrusion die, includes a pair of feed rolls, namely, an upper roll 10 and a lower roll 11 defining therebetween a nip 12 into the intake of which the clay mass is progressively received as the rolls are caused to rotate in the direction of the arrows shown in Figure 2. A bank 13 of the clay may be constantly maintained on a table 14 at the nip intake so as to be picked up by the roll peripheries as they progressively move past the bank. It may be desired to maintain within the bank 13 an auxiliary cathode feed roll or propulsion element to ensure the desired constancy of feed of moist clay into the nip defined by the feed rolls 10 and 11. Each roll is shown with end rings 15 raised from its periphery proper which may be provided with a succession of spaced parallel ribs 16 extending longitudinally thereof. Such ribs, whose surfaces may lie slightly inwardly of the surfaces of the rings 15, thus create a succession of pockets or grooves 17 in the roll periphery wherein the clay may be caught and thus forcibly delivered to a perforated extrusion die 18 serving to close off, excepting at its perforations or extrusion orifices 19, the nip discharge. A gear 20 is shown fixed to one end of the shaft of the lower roll and meshing with a gear 21 fixed to the corresponding end of the shaft of the upper roll; and the rolls may be driven by suitable means (not shown) fixed to a shaft portion 22 of the lower roll shown in Figure 1 as projecting through supporting framework 23 at the left hand side of the machine. The shafts for the upper and lower rolls may be journaled for rotation in suitable bearings afforded by the machine framework, whose details of construction need not be described to those skilled in the art.

As clay is being forced through the extrusion orifices 19, the feed rolls 10 and 11 are impressed with a positive electric charge and the die 18 is impressed with a negative electric charge. To this end, the upper roll 10 may form part of an electric circuit created by a direct current generator 24 whose positive pole is wired through a rheostat or variable resistance 25 to one of the bearings 26 for such roll; and the extrusion die 18 may be included in the same circuit, as by a wire leading therefrom to the negative pole of the generator 24. The lower feed roll 11 becomes impressed with the positive electric charge by reason of the several electro-conducting paths existing between it and the upper roll.

The extrusion die 18 should, of course, be electro-insulated from the feed rolls 10 and 11. Suitable electro-insulating material, such as a rubber pad 27, may for such purpose be interposed between the peripheries of the rolls 10 and 11 and the die 18. The pad 27 may be in wiping contact with the end rings 15 of both the upper and lower feed rolls, as illustrated in Figure 2, thereby ensuring substantially complete closing off of the nip discharge, excepting at the die orifices 19. It might be noted that the ends of the feed rolls are in wiping contact with the machine framework and that such framework provides the desired closure of both ends of the nip discharge so as substantially to prevent lateral leakage of clay from the nip discharge. It might be further noted that the end rings 15 of the upper roll periphery are in rolling contact with the corresponding rings of the lower roll periphery so as to prevent lateral leakage of clay from the nip.

The extrusion die 18 is shown as being essentially an elongated rectangular plate containing two transversely extending rows of perforations 19 and as being fixed to the machine framework by a pair of bolts 28. Because the machine framework is positively charged, the shank of each such bolt 28 and its head are shown as being electro-insulated from the framework by a bushing 29 and a washer 30, respectively. As the elongated clay bodies issue from the extrusion orifices 19, they may be received on an endless belt 31 moving about a terminal roll 32 and driven by suitable means (not shown) to the desired destination, for instance, a drying chamber.

The form of machine shown in Figure 3 is essentially similar to that of Figures 1 and 2, excepting that the axes of its pair of feed rolls 40 are arranged on substantially the same horizontal plane so that such rolls define a nip through which the moist plastic clay may be fed downwardly to a perforated die 41. A bank 42 of the moist plastic clay may be constantly maintained above the nip intake and the clay may be fed downwardly by the roll peripheries through the nip into a receiving space 43 substantially closed off excepting at the die perforations 44. The space 43 may be bounded by spaced bars 45 forming part of a framework affording closure portions for the ends of the nip discharge or space 43. The nip-closure portions 46 of the framework are shown in Figure 4 as engaging over the ends of the feed rolls 40 so that such ends make nice sliding contact therewith in the course of their rotation. It may be desirable to line or surface the internal walls of the bars 45 with rubber or equivalent electro-insulating material so as to inhibit undue concentration therein or diversion therethrough of the electrophoretic current destined for action on the moist clay mass within the chamber 43.

The rolls 40 are impressed in the course of their rotation with a positive electric charge and the perforated die 41 is impressed with a negative electric charge; and, as shown, they may be included in one electrophoretic circuit wherein the die 41 is wired through a rheostat or variable resistance 47 to the negative pole of a direct current generator 48 and wherein the shafts 49 for the rolls 40 are in wiping contact with brushes 50 wired to the positive pole of the generator. The die 41, which may be fixed to the bars 45, as by bolts 51, may be electro-insulated from the rolls 40 in a manner similar to that previously described in considering the machine of Figures 1 and 2. The elongated clay bodies issuing from the extrusion orifices 44 may be received on an endlessly moving belt, for instance, a wire cloth conveyor 52, serving to transport such bodies to a drier or other desired destination.

By virtue of the positive electric charge impressed on the feed rolls of the machine hereof, the clay is attracted to the peripheries of such rolls while water is repelled therefrom, thereby causing such roll peripheries to exert a stronger grip on the clay and to feed the clay more forcibly against the extrusion die. Indeed, such feed grip on the clay is sufficiently great, especially in the downward feed type of machine illustrated in Figure 3, to do away with need for pocketing or entrapping the clay in the roll peripheries in order to develop in the clay the degree of pressure requisite for its extrusion. In other words, the feed roll peripheries may, pursuant to the invention hereof, be substantially smooth and thus be less expensive to construct than when ribbed. Moreover, the use of smooth-periphery feed rolls is conducive to extruded clay bodies of greater integrity than when feeding of the clay is accomplished by ribbed-periphery feed rolls, since such latter rolls tend to induce planes of weakness or cleavage in the extruded clay bodies. Besides minimizing clay slippage in the feed roll nip, the invention hereof ensures the lubrication desired on the walls of the extrusion orifices, since moisture from the moist plastic clay is attracted to such walls by reason of the negative electric charge thereat and, by keeping such walls clean or unfouled, enables extrusion of the clay under lower pressure and with lower power consumption than in the absence of such lubrication. Because there is a tendency to develop acidity and/or oxidizing condition at the feed roll peripheries on account of the anodic electrolyzing action thereat, such roll peripheries are preferably constructed of or surfaced with relatively corrosion-resistant material, such as hard lead or nickel. On the other hand, there is a tendency to develop a condition of alkalinity at the extrusion die, wherefore, such die may be constructed of steel. The alkalinity developed in the moisture attracted to the extrusion die surfaces tends to increase the fluidity of the clay adjacent to such surfaces. It is probably the case that the greater fluidity in the clay adjacent to the extrusion die surfaces arises from deflocculation of the clay which, as is well known, is promoted by a condition of alkalinity. Per contra, there is evidently tendency for flocculation of the clay and for increase in its viscosity to occur where it contacts with the positively charged feed roll peripheries, which flocculation and increase in viscosity is evidently attributable to acidity and/or developed at the peripheries and is probably partly responsible for the enhanced grip of the peripheries on the clay.

It is possible to maintain various voltages between the positively charged feed roll peripheries and the negatively charged extrusion die of the machine hereof in accomplishing through the phenomenon of electrophoresis the desired actions at the roll peripheries and at the extrusion die. Thus, voltages ranging from about 20 to about 120 have been found to give beneficial effects sufficiently marked to warrant commercial operation of the machine hereof under such voltages.

The principles of the invention hereof are applicable to various moist plastic material lending themselves to extrusion and exhibiting electrophoresis in a way similar to moist plastic clay. For instance, the principles hereof may be applied to moist plastic masses of fossil earth or so-called kieselguhr, various inorganic pigments, such as lithopone, cement-forming mixtures, and other inorganic or organic bodies to undergo drying, clinkering, or other treatments of a mechanical or chemical nature that can be performed to best advantage upon extruded elongated bodies of small substantially uniform cross-sectional area rather than upon large masses of widely variant sizes and shapes. It is to be further understood that the method and machine hereof may be useful in extruding moist plastic material through but one opening or extrusion orifice, for instance, through an extrusion die wherein there is a single orifice of a size and shape to yield from a moist plastic clay composition or the like an extruded body of the desired cross-sectional area to be cut into slabs, bricks, rods, or like units to be subjected to drying and/or firing treatments.

I claim:

1. A method of extruding moist plastic material involving the feeding of such material into a nip defined by propelling members and the extrusion of such material as it issues under pressure from the nip through a perforated die, which comprises impressing the surface of said propelling members with a positive electric charge and said die with a negative electric charge as the moist plastic material is being fed into the nip of said members and is being extruded through said die, thereby attracting moisture from such material to the negatively charged die walls, including its perforation walls, and thus lubricating such walls to maintain them in substantially unfouled condition while diminishing slippage of said material on said propelling surfaces by reason of attraction of the material to said positively charged surfaces.

2. A method of extruding moist plastic clay involving the feeding of such clay into a nip defined by propelling members and the extrusion of such clay as it issues under pressure from the nip through a perforated die substantially closing off discharge from the nip excepting where said die is perforated, which comprises impressing the surfaces of said propelling members with a positive electric charge and said die with a negative electric charge as moist plastic clay is being fed at a moisture content less than about 25% into the nip of said members and is being extruded through said perforated die, thereby attracting moisture from such clay to the negatively charged die walls, including its perforation walls, and thus lubricating such surfaces to maintain them in substantially unfouled condition while diminishing slippage of said clay on said propelling surfaces by reason of attraction of the clay particles to said positively charged surfaces.

3. A machine of the class described comprising a pair of propelling members defining therebetween a nip into which moist plastic material may be progressively fed, a perforated die arranged in front of the nip discharge to permit extrusion therethrough of material issuing under pressure from the nip, means for impressing the propelling surfaces of said members with a positive electric charge, and means for impressing said perforated die with a negative electric charge, said die being electro-insulated from said propelling members.

4. A machine of the class described comprising a pair of rolls defining therebetween a nip into which moist plastic material may be progressively fed, a perforated die arranged in front of the nip discharge to permit extrusion therethrough of material issuing under pressure from the nip, means for impressing the peripheries of said rolls with a positive electric charge, and means for impressing said perforated die with a negative electric charge, said die being electro-insulated from said rolls, and said roll peripheries being afforded by electro-conducting material of relatively high resistance to such acidity and/or oxidizing tendency as is electrically generated thereat.

5. A machine of the class described comprising a pair of smooth-periphery rolls defining therebetween a nip through which moist plastic material may be fed downwardly, a perforated die arranged in front of the nip discharge and, excepting where perforated, substantially closing off discharge from the nip, thereby permitting material issuing under pressure from the nip to be extruded therethrough, means for impressing the peripheries of said rolls with a positive electric charge, and means for impressing said perforated die with a negative electric charge, said die being electro-insulated from said rolls.

SANFORD C. LYONS.